Patented Dec. 26, 1933

1,941,077

UNITED STATES PATENT OFFICE 1,941,077

PRODUCTION OF ACETYLENE FROM HYDROCARBONS IN ELECTRIC ARCS

Otto Eisenhut, Heidelberg, Robert Stadler, Ziegelhausen, and Paul Baumann, Ludwigshafen-on-the-Rhine, Germany, assignors to I. G. Farbenindustrie Aktiengesellschaft, Frankfort-on-the-Main, Germany No Drawing. Application July 6, 1931, Serial No. 549,098, and in Germany July 14, 1930

3 Claims. (Cl. 204—31)

The present invention relates to improvements in the production of acetylene from hydrocarbons in electric arcs.

We have found that according to the present invention it is possible to obtain acetylene in a very high concentration from gaseous or vaporous hydrocarbons, which are hereinafter referred to as vaporized hydrocarbons, such as hydrocarbons of the methane series, as for example methane, ethane, propane, butane or even higher homologues, or unsaturated hydrocarbons such as olefines, either alone or in mixture with other gases, as they may be obtained from cracking operations, or tars or oils or distillation products thereof, or mixtures of the said hydrocarbons or gases and vapours containing the same in admixture with other gases such as hydrogen or nitrogen, by treatment in the electric arc while at the same time obtaining a satisfactory utilization of energy with reference to the amount of the product formed. The said result is obtained by treating the initial materials with an electric arc of very high energy, that is to say under such conditions that the consumption of energy per second and per cubic centimeter of the space actually filled by the electric arc amounts on an average to 2 kilowatts or more. Electric arcs of this nature show an unusual image when observed spectroscopically. The Balmer series of the hydrogen is visible in an entirety hitherto never obtained; hitherto it has been almost exclusively observed in glow discharges and when observed in the electric arc only in cases when hydrogen is present without appreciable contamination by hydrocarbons and then only in small dimensions. Thus for example the line $H_\epsilon$, according to the literature, has only been obtained in the electric arc with pure hydrogen, and then has been described as only just recognizable. According to the present invention, contrary to expectation the line $H_\epsilon$ is strongly marked and moreover the line $H_\zeta$ is quite clear. Even higher members of the Balmer series are present but these are only recognizable with difficulty by reason of the almost non-suppressible cyanogen spectrum which occurs in the same region. Moreover the breadth of the lines and especially the self-reversal to be observed at $H_\alpha$ and still more strongly at $H_\beta$ assume quite unusual proportions in the electric arcs produced according to the present invention. When the dimensions of the sources of current are sufficient, electric arcs of the said kind may be produced in a continuously stable state. The gases may be supplied practically free from eddies, as for example according to the invention forming the subject-matter of application Ser. No. 471,070 and the furnace may be so dimensioned that the electric arc continually fills practically the whole of the reaction space available so that almost the whole amount of gas mixture to be treated is subjected to the action of the electric arc. The electric arc may, however, be caused to burn within a comparatively wide furnace so that the discharge does not fill the whole furnace space; in this case it is preferable to lead the gases most strongly exposed to the action of the electric arc and therefore containing acetylene in a high concentration through different outlets from the gases surrounding them which are less rich in acetylene and thus to separate them.

The conditions of working electric arcs of this kind may be varied in many ways, as for example as regards the amount of gas sent through, the composition of the gas and the pressure of the gas. As a rule the tension of the electric arc is the higher the higher the velocity of flow of the treated gas is selected. The consumption of energy is generally the greater the greater is the content of carbon in the gases. Acetylene may readily be produced from methane in a concentration of from 10 to 16 per cent or more. The yields, for example when working up methane and gas mixtures containing methane, amount to from 70 to 90 liters and more of acetylene per kilowatt hour.

The following examples will further illustrate the nature of this invention, but the invention is not restricted to these examples.

Example 1

A mixture of equal parts of methane and hydrogen is subjected to the action of an electric arc of 100 kilowatts at a tension of 2 kilovolts in a tubular furnace 20 millimeters in internal diameter and 200 millimeters in length which accordingly confines a space of 62.8 cubic centimeters. The average consumption of energy per second is thus 1.6 kilowatts per cubic centimeter of furnace space. In the spectrum the Balmer series, inter alia, is clearly visible up to the line $H_\delta$; the lines are broad and show self-reversal.

The gas leaving the furnace contains 7.9 per cent of acetylene in a yield of 75 liters per kilowatt hour.

If, however, the same gas mixture is worked up in a furnace only 12 millimeters in diameter and 420 millimeters in length while employing the same electrical energy so that the average energy density is 2.1 kilowatts per cubic centimeter, the concentration of acetylene increases to 9.0 per cent and the utilization of energy to 80 liters of acetylene per kilowatt hour. The Balmer series in the spectrum of the electric arc is now much more clearly defined, $H_f$ being quite marked. Even far behind the electric arc the lines are broad and self-inverted.

*Example 2*

A gas mixture containing 15 per cent of methane, 15 per cent of ethane, 4 per cent of propane and 1 per cent of higher hydrocarbons, the remainder consisting of hydrogen, is passed through a tubular electric arc furnace 420 millimeters long and 30 millimeters in internal diameter. The tension of the arc of 500 kilowatts amounts to 3000 volts. The average consumption of energy per second is thus 1.7 kilowatts per cubic centimeter. On account of the fact that the whole of the space of the furnace is not filled out by the arc, the concentration of energy in the discharge zone proper is of course considerably more than 2 kilowatts per cubic centimeter. In the spectrum the whole of the Balmer series is visible and strong self-reversal is observed at $H_\alpha$ $H$ pure$_\beta$. The gas leaving the arc furnace contains 11 per cent of acetylene corresponding to a yield of 80 liters per kilowatt hour.

*Example 3*

A gas mixture containing 90 per cent of methane and its homologues the remainder consisting of hydrogen and nitrogen is passed through a tubular electric arc furnace 150 millimeters long and 10 millimeters in internal diameter. The tension of the arc during the operation amounts to 1150 volts, its consumption of energy to 90 kilowatts per second. The average consumption of energy per second and per cubic centimeter is thus 7.6. In the spectrum the whole of the Balmer series up to the high members thereof ($H_f$) is clearly visible. The final gas contains 20 per cent of acetylene corresponding to a yield of 120 liters per kilowatt hour.

What we claim is:

1. A process for the production of acetylene which comprises treating a gas comprising a vaporized hydrocarbon in an electric arc having a consumption of energy of at least 2 kilowatts per second and per cubic centimeter of the space filled by the arc.

2. A process for the production of acetylene which comprises treating a gas comprising methane in an electric arc having a consumption of energy of at least 2 kilowatts per second and per cubic centimeter of the space filled by the arc.

3. A process for the production of acetylene which comprises treating a mixture of methane and hydrogen with an electric arc of about 100 kilowatts per second burning in a cylindrical space of about 48 cubic centimeters.

OTTO EISENHUT.
ROBERT STADLER.
PAUL BAUMANN.